(12) United States Patent
Carroll et al.

(10) Patent No.: US 8,061,723 B1
(45) Date of Patent: Nov. 22, 2011

(54) VERTICALLY EXTENDABLE EQUIPMENT STORAGE BUCKET APPARATUS AND METHOD

(75) Inventors: Troy Carroll, Cypress, TX (US); Charles Conner, Cypress, TX (US)

(73) Assignee: TCR Products LLC, Sugar Land, TX (US)

( * ) Notice: Subject to any disclaimer, the term of this patent is extended or adjusted under 35 U.S.C. 154(b) by 271 days.

(21) Appl. No.: 12/492,996

(22) Filed: Jun. 26, 2009

(51) Int. Cl.
*B62B 1/20* (2006.01)

(52) U.S. Cl. .................. 280/47.29; 280/47.26; 280/659; 414/490

(58) Field of Classification Search .................. 280/638, 280/655.1, 659, 47.24, 47.27, 47.28, 47.29, 280/79.5, 47.26; 414/490, 444, 540
See application file for complete search history.

(56) References Cited

U.S. PATENT DOCUMENTS

| 5,738,480 | A  | * | 4/1998 | Butzen ........................ 414/490 |
|---|---|---|---|---|
| 5,938,396 | A  | * | 8/1999 | Audet ........................ 414/490 |
| 6,149,168 | A  | * | 11/2000 | Pauser et al. ............. 280/47.371 |
| 6,530,740 | B2 | * | 3/2003 | Kim ............................ 414/490 |
| 6,715,627 | B1 |   | 4/2004 | Bonner et al. |
| 6,851,566 | B1 |   | 2/2005 | Bonner |
| 6,886,703 | B1 |   | 5/2005 | Bonner |
| 7,387,306 | B2 | * | 6/2008 | Zimmer ..................... 280/47.29 |
| 7,431,313 | B1 | * | 10/2008 | Torres et al. ............... 280/47.26 |
| 7,823,893 | B2 | * | 11/2010 | Meyers et al. ............. 280/47.29 |

* cited by examiner

*Primary Examiner* — John Walters
(74) *Attorney, Agent, or Firm* — Richard A. Fagin

(57) ABSTRACT

A vertically adjustable baseball equipment apparatus includes a blow moldable support platform that forms a container indexing recess for capture of an equipment storage container. The container is vertically adjustable. A vertically elongated and telescoping extension handle is perpendicularly affixed and laterally offset on the platform. A pair of larger wheels is attached about one outer edge of the platform, allowing for a cantilevered leverage and support of the equipment container and rolling transport over uneven surfaces such as grass and dirt.

13 Claims, 6 Drawing Sheets

VERTICALLY EXTENDABLE EQUIPMENT STORAGE BUCKET APPARATUS AND METHOD

RELATED APPLICATIONS

The present application is a copending with U.S. patent application Ser. No. 29/339,252, filed on Jun. 26, 2009, and incorporated by reference herein and claiming the benefit of priority therefrom.

BACKGROUND OF THE INVENTION

1. Field of the Invention

The present invention relates generally to an equipment storage bucket and, more particularly, to such a vertically extendable equipment storage bucket apparatus.

2. Description of the Related Art

Vertically extended work bucket are known in the art, namely:

U.S. Pat. No. 6,715,627 issued Apr. 6, 2004 in the name of Bonner et al.;

U.S. Pat. No. 6,851,566 issued Feb. 8, 2005 in the name of Bonner; and

U.S. Pat. No. 6,886,703, issued May 3, 2005 in the name of Bonner.

Each of these references is incorporated by reference herein as if rewritten in its entirety, and each describes a beneficial task neutral work bucket and teaches various manners in which the work bucket can be elevated or retracted between work and storage positions, respectively. For example, the '627 reference describes a pair of nesting 5-gallon work buckets that are nestably engaged and connected with a linear, vertical sliding track that interconnects the two. In this fashion, the upper bucket can be elevated to allow for raising of a bucket of water while washing cars, cleaning windows, and the like, thereby eliminating bending over and reducing back strain. A plurality of castor-type wheels are shown to allow movement of the utilized bucket around the work area.

In an additional example, the '566 reference again provides for nestable bucket arrangements and provides an improved alternate embodiment of engaging and connecting the upper and lower buckets. The lower bucket forms a guide channel configured with a vertical guide channel and a number of horizontal locking channels. The upper bucket forms an outwardly protruding guide pin. The engagement between and movement of the guide pin into the guide channel provides the linear, vertical sliding interconnection between the two.

In the final example, the '703 reference improves upon the configuration of the guiding and locking channel in which at least two furrow series formed along the inner sidewall of the shell receives a plurality of corresponding ribs formed along the outer sidewall of the container to facilitate vertical adjustment through a stepped, lift-and-rotate motion.

While these references combined teach various and effective ways of providing a general purpose, liquid containing work bucket that can elevate its contents to meet the user and still remain substantially portable about a general purpose work area, it has been found that such designs have drawbacks when applied to certain task specific applications.

One such task specific application deals generally with the game of baseball. In training at baseball in any level, there are two major areas that cannot be ignored: batting practice; and pitching practice.

Many aids for batting practice exist; however, none simulate the presence of a live pitcher sufficiently to function as a complete replacement. Similarly, some aids for pitching practice exits, with none quite the same as facing a live batter. So, for a pitcher and hitter to obtain enough repetitions in a short amount of time to become beneficial training exercises for either, the current method includes a batting practice pitcher taking the pitching mound with a large volume of baseballs, and pitching them one after another at a batter. However, in such an routine the pitcher needs to bend over between each pitch to retrieve another ball, and the features and benefits of the prior art references, if available in this task specific application, would provide analogous benefits.

However, in attempting to utilize the prior art in such a manner, serious drawbacks were discovered making such devices incapable of functioning for such a task specific application.

By way of example, and not as a limitation, the forum in which batting practice usually occurs, i.e. outdoors on a grass and/or dirt field, do not accommodate a castor wheeled, nested bucket. In the storage and retrieval of baseballs a water holding, even nested bucket creates limited wieldability, and the need to connect or nest storage element itself is a great hindrance in that a bucket of baseballs can be used in many drills on many parts of the field (i.e. pitching practice, fielding practice, fly-ball practice, etc.)

Consequently, a need exists for providing a vertically extendable equipment storage bucket apparatus that is specifically adapted for use in baseball and in support of baseball practice activities.

SUMMARY OF THE INVENTION

It is therefore an object of the present invention to provide a vertically adjustable baseball equipment bucket apparatus.

It is a further object of the present invention to provide an apparatus having a generally opened support platform capable of transporting a variety of sized and shaped equipment storage containers.

It is a further object of the present invention to provide a support platform that is linearly adjustable.

It is a further object of the present invention to provide a vertically adjustable baseball equipment bucket apparatus that has laterally offset wheels capable of transporting the baseball equipment bucket apparatus over outdoor terrain such as grass and dirt.

It is a further object of the present invention to provide an apparatus that includes a telescoping extension handle to provide for easily manipulated leverage and towage of the baseball equipment bucket apparatus and supported equipment storage container.

Briefly described according to one embodiment of the present invention, a vertically adjustable baseball equipment apparatus is provided that includes a support platform that forms a container indexing recess for capture of an equipment storage container. The platform is vertically adjustable. A vertically elongated and telescoping extension handle is perpendicularly affixed and laterally offset on the platform. A pair of wheels is attached about one outer edge of the platform, allowing for a cantilevered leverage and support of the equipment container.

A feature of the present invention includes the use of durable materials, including metal and plastics, in an economially efficient design that is capable of withstanding repeated usage and providing a long useful life to the apparatus.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
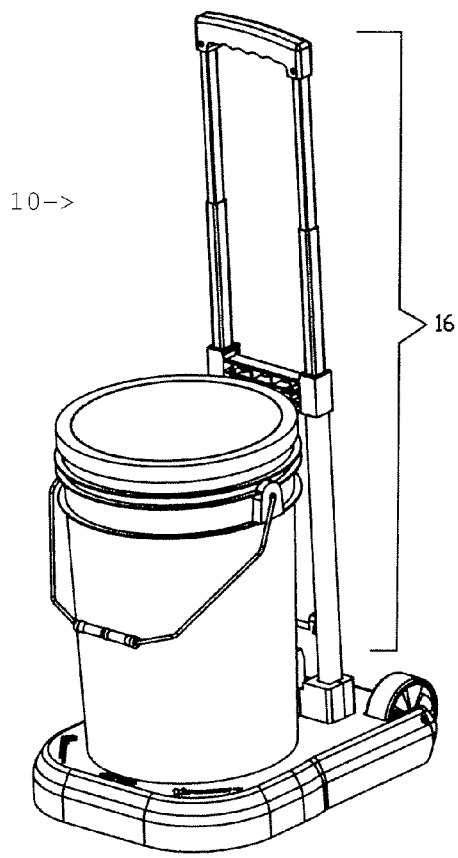
FIG. 1 is a perspective view of a vertically extendable baseball equipment apparatus according to a preferred embodiment, wherein the container is resting at a lower position and the handle is telescoped upward.

The best mode for carrying out the invention is presented in terms of its preferred embodiment, herein depicted within the FIGS. 1-8.

1. Detailed Description of the Figures

Referring now to FIG. 1 through FIG. 8, a vertically extendable baseball equipment apparatus 10 is shown in accordance with a preferred embodiment of the present invention. The apparatus 10 comprises a platform 12 and a container 14 supported thereon. As shown herein, the container 14 is of a bucket shaped element, and is capable of being supplied in the size and shape of an otherwise conventional 5-gallon plastic bucket; however, such a size and shape is not intended as a limitation, and a few such alternate embodiments will be shown and described below. A handle 16 and a plurality of rollers, preferably wheels 18 affixed to one side of the platform 12, provided to allow the apparatus 10 to roll in a variety of directions when tilted there toward. The handle mechanism 16 is formed of separate telescoping members (as described below) and is attached perpendicularly to the platform 12 at a laterally offset position.

Figure 2:
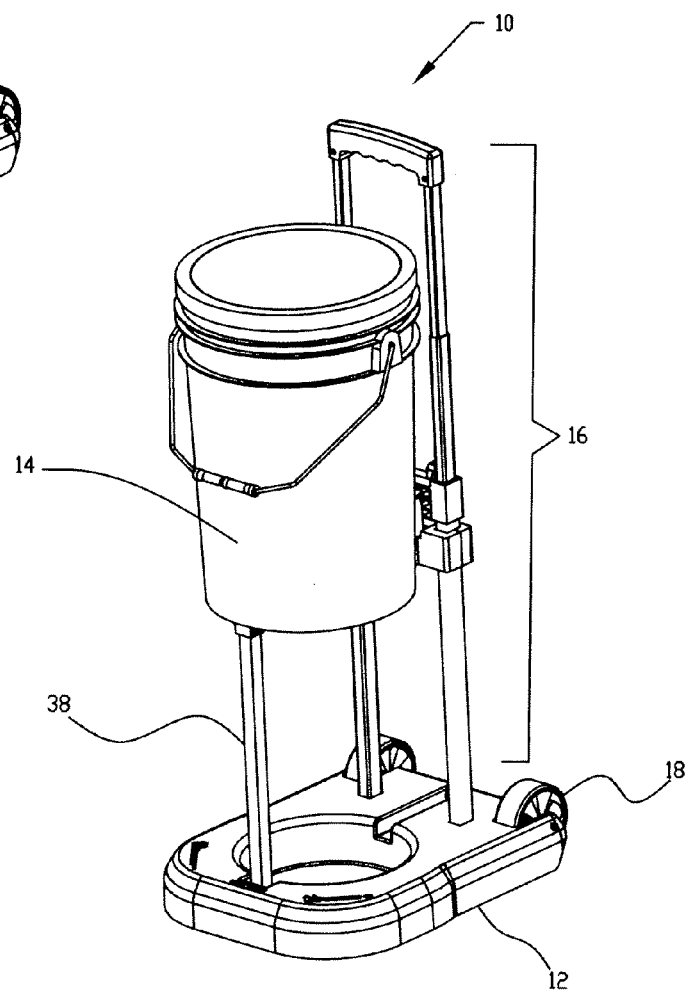
FIG. 2 is a perspective view of the vertically extendable baseball equipment apparatus, wherein the container is vertically adjusted upper position and the handle is telescoped upward.
Figure 3:
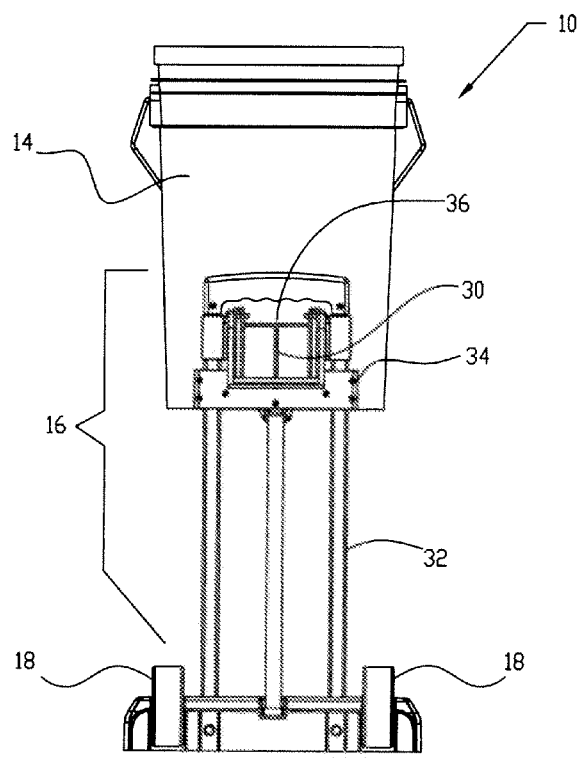
FIG. 3 is a rear elevational view of the vertically extendable baseball equipment apparatus of FIG. 2, wherein the container is vertically adjusted upper position and the handle is retracted inward to a minimum profile.
Figure 4:
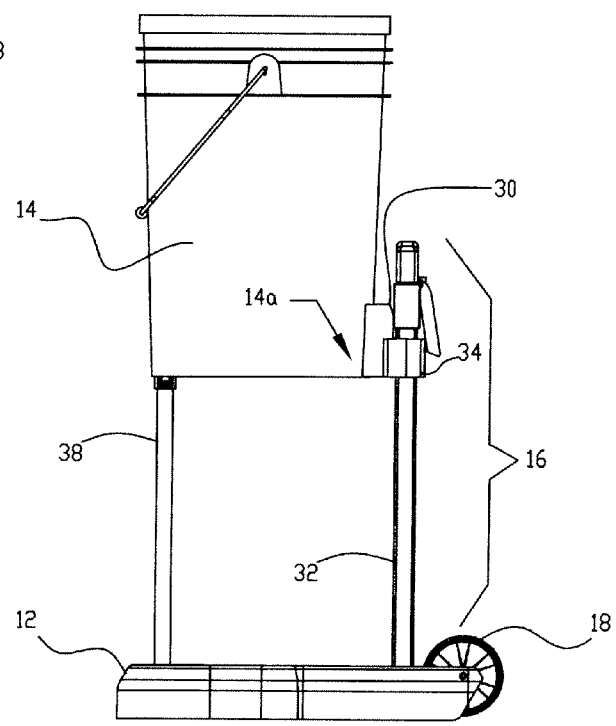
FIG. 4 is a side elevational view thereof.
Figure 5:
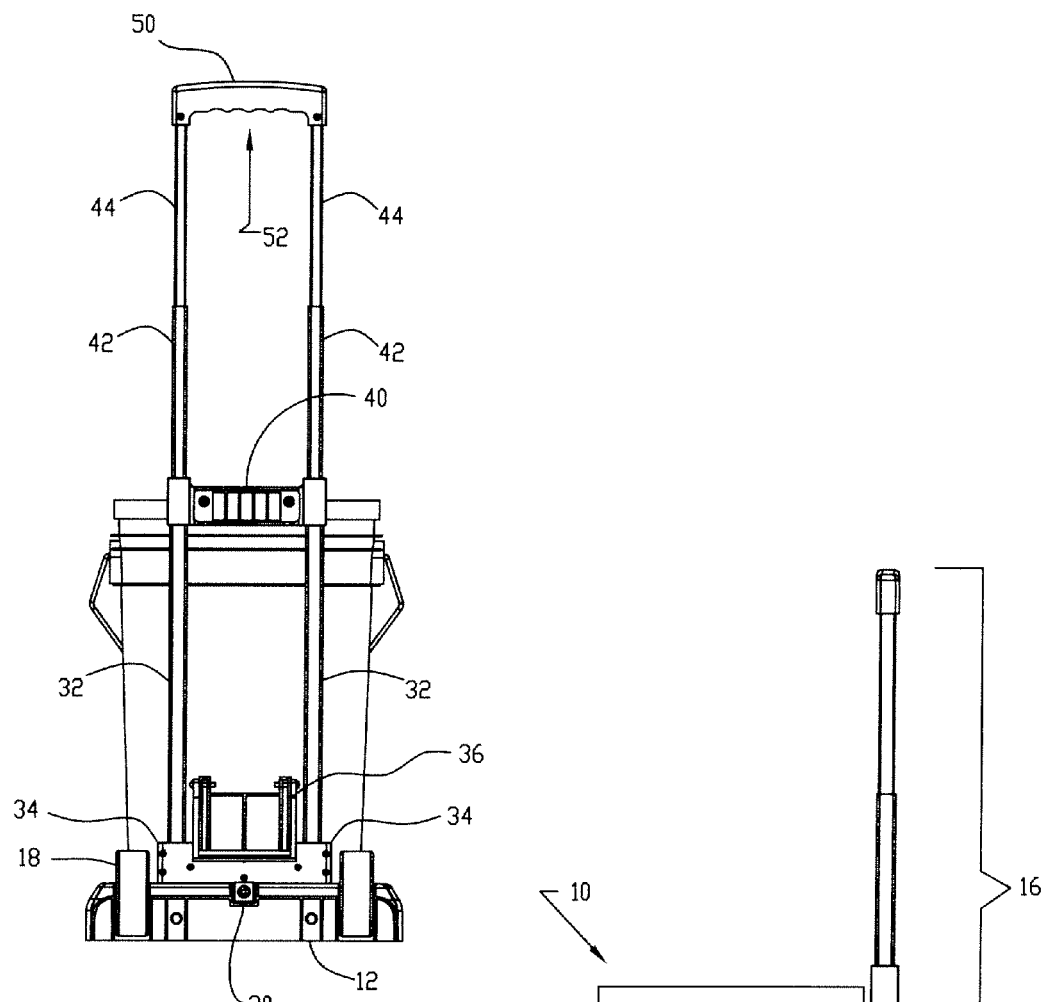
FIG. 5 is a rear elevational view of the vertically extendable baseball equipment apparatus of FIG. 1.
Figure 6:
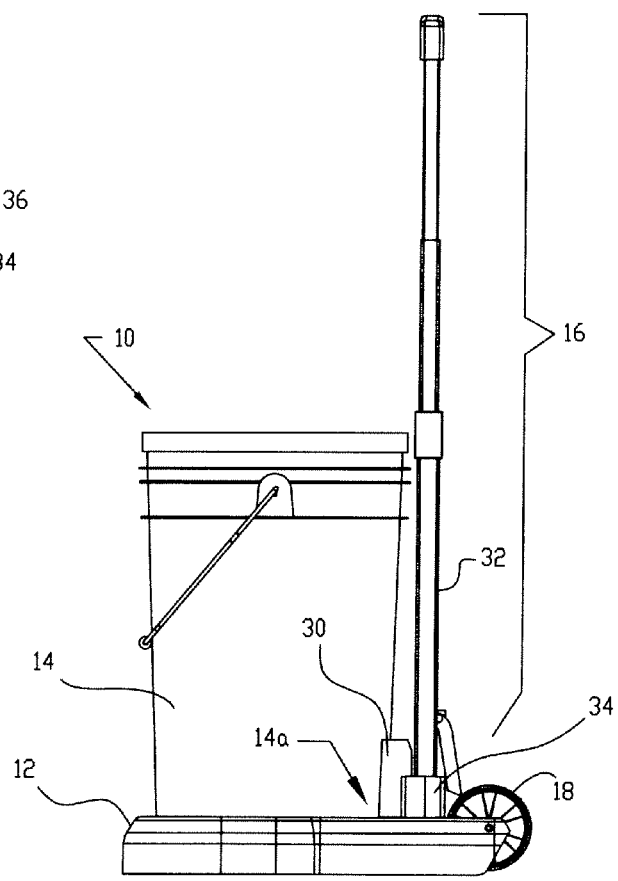
FIG. 6 is side elevational view thereof.
Figure 7:
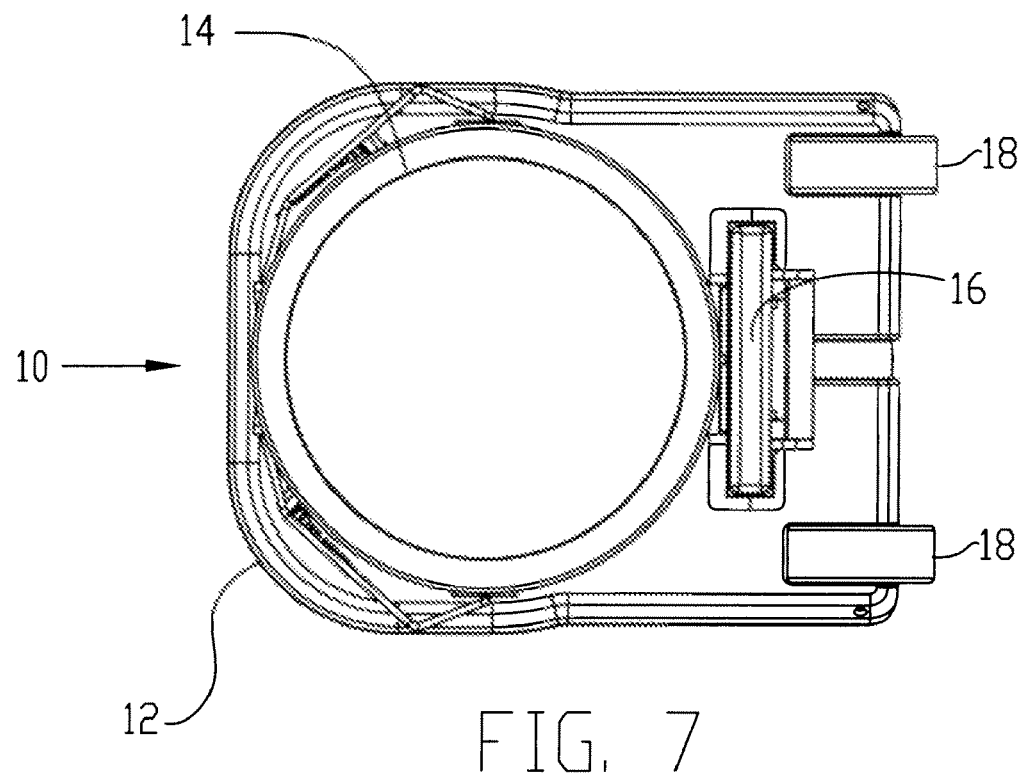
FIG. 7 is a top plan view thereof.
Figure 8:
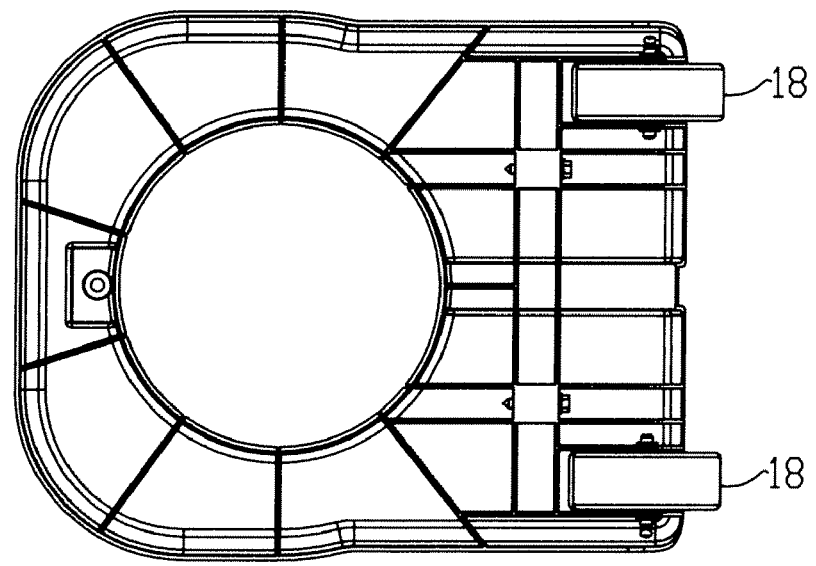
FIG. 8 is a bottom plan view thereof.

In an extended condition as best shown in FIGS. 2-4, the container 14 is affixed at a lower, outer sidewall 14a to a support brace 30. While in the preferred embodiment the brace 30 is in rigid mechanical connection, such as through the use of mechanical fasteners, welding or adhesive, it is anticipated to a person having ordinary skill in the relevant art, in light of the present teachings, that the container 14 could be removably affixes or attached to the brace 30 as well. In either instance the brace 30 slidingly travels vertically on a pair of parallel lower handle rails 32 that are part of the handle mechanism 16. In the preferred embodiment as shown, the brace 30 forms a pair of tubular collars 34 for this purpose. Between the collars 34 is further formed a flexible locking flange 36 formed of an extended tab or living hinge that can lockingly engage with an upper connection tie 40 that terminates and retains the upper ends of the lower handle rails 32. When in this upper condition, a pivotal support element 38 can be pivoted from within the base 12 where is it stored when collapsed to a vertical position for supporting the bottom of the container 14 opposite the side connected to the brace 30. While it is anticipated that many other locking or attachment mechanisms can be provided to accomplish an equivalent function (some of which are described below as alternate embodiments), for purposes of adequately disclosing a preferred embodiment such a locking or attachment mechanism is described. It should be aware to one skilled in the relevant art that such a mechanism is not a limitation on the overall features and functionality of the vertically extendable baseball equipment apparatus 10 as anticipated, shown and described.

The handle mechanism 16 is anticipated as being of a vertically telescoping design. In an extended position, as shown best in FIGS. 1, 5 and 6, the handle mechanism 16 is formed of a pair of parallel lower handle rails 32 that are perpendicularly affixed at their lower end to the platform 12, and terminate and retained at their upper ends by the upper connection tie 40. Additionally, a number of additional rails are anticipated as telescoping upward from each lower handle rail 32. Shown herein are a central handle rail 42 and upper handle rail 44. There is no limitation intended in the use of only two telescoping extensions from the lower rail 32, but such number was merely a design choice for balancing the intended end product specifications, cost and complexity for its intended commercial application. In any event the upper handle rails 44 are shown terminated at their upper end by a handle 50 that both forms a rigid parallel tie there between as well as a shaped grip 52 for egrometrically conforming to a users grasp.

In a retracted position, as shown best in FIGS. 2-4, the handle mechanism 16 collapses for convenience of storage. As also noted in a comparison of the extended position FIGS. 1, 5-6) with the retracted position FIGS. 2-4) the linear positioning of the container 14 in an upper or lower position is independent of the telescoping condition of the handle mechanism 16.

Figure 9:
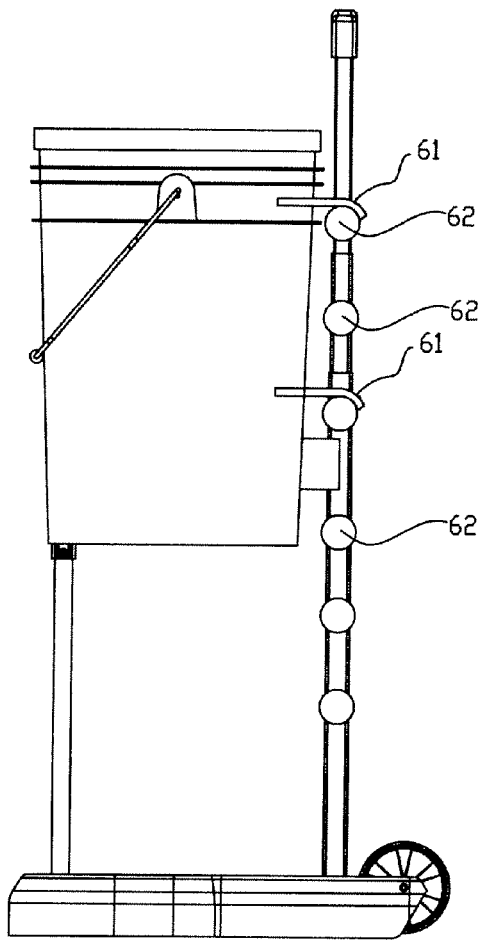
FIG. 9 is a vertically extendable baseball equipment apparatus according to a first alternate embodiment.
Figure 10:
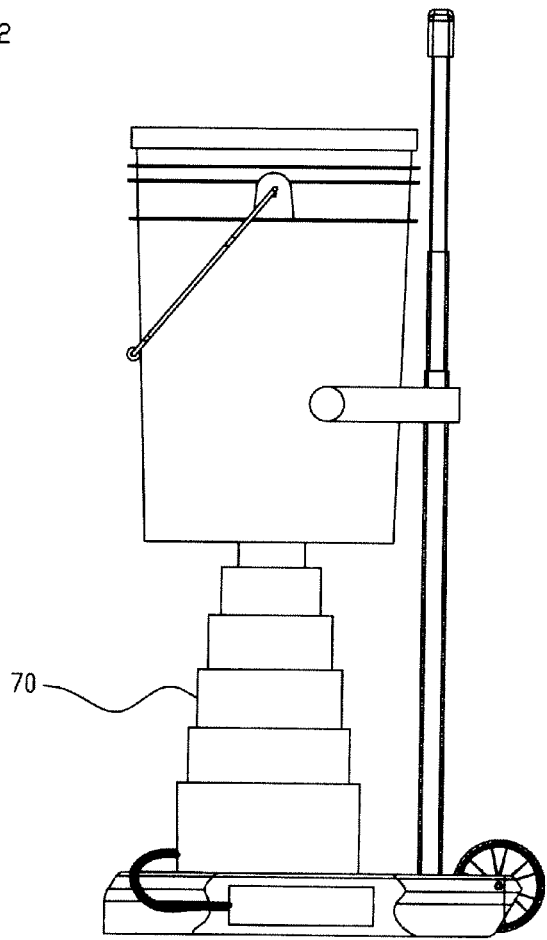
FIG. 10 is a vertically extendable baseball equipment apparatus according to a second alternate embodiment.
Figure 11A:
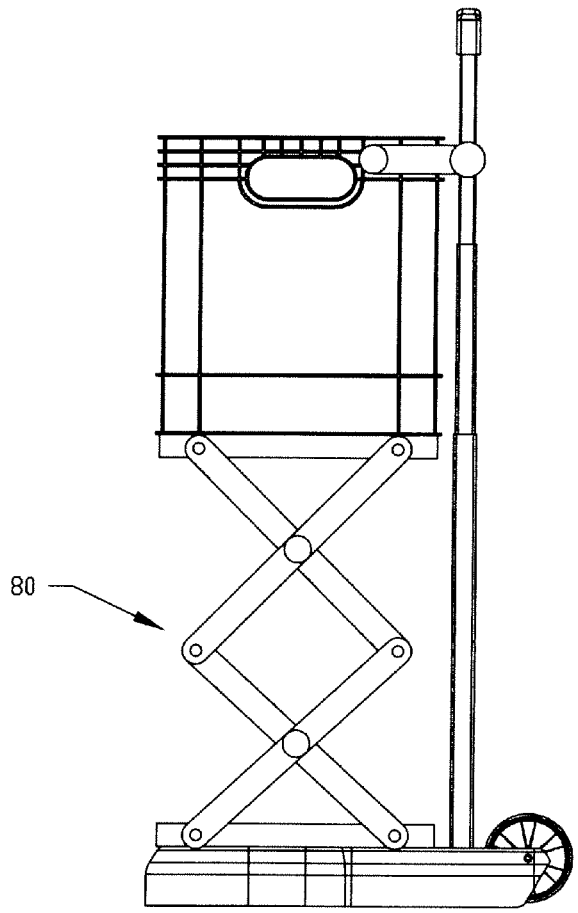
FIG. 11a and FIG. 11b are a vertically extendable baseball equipment apparatus according to a third alternate embodiment, shown in an extended and retracted configuration, respectively.
Figure 11B:
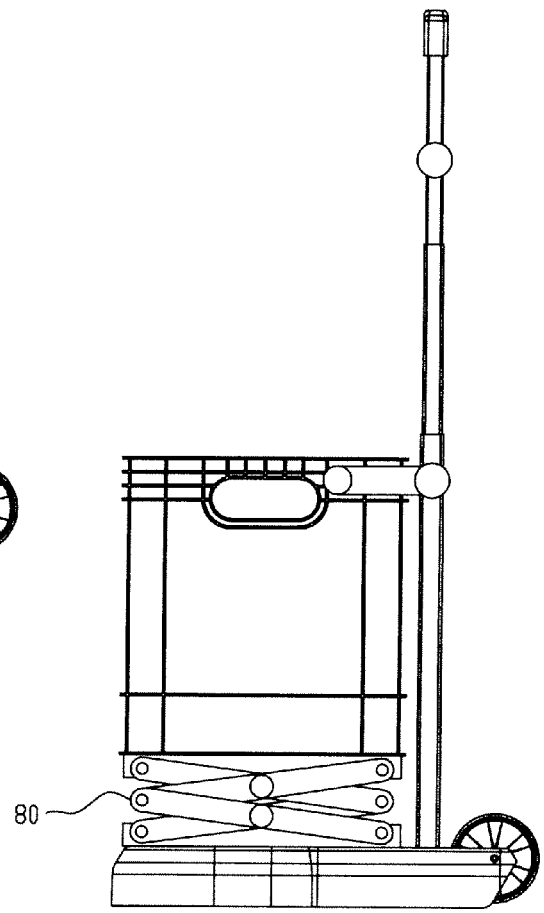

As shown and described herein, a vertically extendable baseball equipment apparatus 10 as shown and described in accordance with the preferred embodiment of the present invention is capable of specific adaptation to the use in baseball and in support of baseball practice activities, while at the same time economizing the materials, assembly and tooling necessary to provide such a device of sufficient strength. It is anticipated that many of these features functions can be obtained with equivalents and substitutions to certain elements set forth above. For example, as shown in FIG. 9, a first alternate embodiment is shown in which a variation on the brace 30 slidingly traveling vertically on a pair of parallel lower handle rails 32 is provided which the container 14 has a plurality of extended brackets 61 that impinge in a coordinated fashion with corresponding hooking elements 62. Similarly, FIG. 10 shows a hydraulic type lift 70 mechanism, and FIG. 11a-11b show a scissor lift mechanism 80. Further, FIG. 11a-11b also show alternate types of containers 14, herein shown as a milk crate type of container by example, and not as a limitation.

2. Operation of the Preferred Embodiment

As assembled, a user will use the apparatus 10 in a manner similar to the accustomed use of a baseball equipment. A user will place the desired material within the container 14, and using the provided rollers 18, the user may transport the apparatus 10 to another location without having to strain or lift the apparatus 10. To adjust the vertical profile of the apparatus 10, a user (either before or after filling the container 14) will grasp and raise the container 14 and then locked the container 14 in the desired position.

It is understood that equivalents and substitutions to certain elements set forth above may be obvious to those skilled in the art, and the foregoing descriptions of specific embodiments of the present invention have been presented for purposes of illustration and description only. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A vertically extendable equipment apparatus comprising:
    a platform;
    a container supported by said platform;
    a handle mechanism operatively affixed to said platform;
    a plurality of rollers or wheels affixed to one side of said platform, thereby allowing the apparatus to roll in a variety of directions when the platform is tilted toward said rollers or wheels;
    wherein said container is capable of being selectively affixed along said handle such as to present said container in a vertically elevated position;
    wherein said container is affixed at a lower, outer sidewall to a support brace via a rigid mechanical connection; and said brace slidingly travels vertically on a pair of parallel lower handle rails that are part of said handle mechanism; and
    wherein said brace forms a pair of tubular collars, a flexible locking flange formed between said tubular collars, said flexible locking flange formed of an extended tab or living hinge that can lockingly engage with an upper connection tie that terminates and retains upper ends of the lower handle rails.

2. The vertically extendable equipment storage apparatus of claim 1 wherein said container is of a bucket shaped element.

3. The vertically extendable equipment storage apparatus of claim 2, wherein said bucket shaped element is in the size and shape of an otherwise conventional 5-gallon plastic bucket.

4. The vertically extendable equipment storage apparatus of claim 1 wherein said handle mechanism is formed of separate telescoping members and is attached perpendicularly to said platform at a laterally offset position.

5. The vertically extendable equipment storage apparatus of claim 1, further comprising a pivotal support element can be pivoted from within said base where is it stored when collapsed to a vertical position for supporting the bottom of said container opposite a side connected to said brace.

6. The vertically extendable equipment storage apparatus of claim 1, wherein said handle mechanism is vertically telescoping.

7. The vertically extendable equipment storage apparatus of claim 1, wherein said base is blow molded.

8. A vertically extendable equipment apparatus comprising:
    a platform;
    a container supported by said platform;
    a handle mechanism operatively affixed to said platform;
    a plurality of rollers or wheels affixed to one side of said platform, thereby allowing the apparatus to roll in a variety of directions when the platform is tilted toward said rollers or wheels;
    wherein said container is capable of being selectively affixed along said handle such as to present said container in a vertically elevated position;
    wherein said container is affixed at a lower, outer sidewall to a support brace via a rigid mechanical connection; and said brace slidingly travels vertically on a pair of parallel lower handle rails that are part of said handle mechanism; and
    further comprising a pivotal support element that can be pivoted from within said base where the pivotal support element is stored when collapsed to a vertical position for supporting a bottom of said container opposite a side connected to said brace.

9. The vertically extendable equipment storage apparatus of claim 8 wherein said container is of a bucket shaped element.

10. The vertically extendable equipment storage apparatus of claim 9 wherein said bucket shaped element is in the size and shape of an otherwise conventional 5-gallon plastic bucket.

11. The vertically extendable equipment storage apparatus of claim 8 wherein said handle mechanism is formed of separate telescoping members and is attached perpendicularly to said platform at a laterally offset position.

12. The vertically extendable equipment storage apparatus of claim 8 wherein said handle mechanism is vertically telescoping.

13. The vertically extendable equipment storage apparatus of claim 8 wherein said base is blow molded.

* * * * *